United States Patent
Agrawal et al.

(10) Patent No.: US 11,722,519 B1
(45) Date of Patent: *Aug. 8, 2023

(54) SYSTEM AND METHOD FOR DYNAMICALLY AVOIDING DOUBLE ENCRYPTION OF ALREADY ENCRYPTED TRAFFIC OVER POINT-TO-POINT VIRTUAL PRIVATE NETWORKS FOR LATERAL MOVEMENT PROTECTION FROM RANSOMWARE

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: AIRGAP NETWORKS INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,531

(22) Filed: Nov. 8, 2022

Related U.S. Application Data

(63) Continuation-in-part of application No. 17/521,092, filed on Nov. 8, 2021, which is a continuation of application No. 17/357,757, filed on Jun. 24, 2021, now Pat. No. 11,171,985.

(51) Int. Cl.
*H04L 9/40* (2022.01)
*H04L 12/46* (2006.01)

(52) U.S. Cl.
CPC ...... *H04L 63/1466* (2013.01); *H04L 12/4641* (2013.01); *H04L 63/1416* (2013.01)

(58) Field of Classification Search
CPC ............ H04L 63/1466; H04L 12/4641; H04L 63/1416
USPC .......................................................... 726/23
See application file for complete search history.

(56) References Cited

U.S. PATENT DOCUMENTS

| | | |
|---|---|---|
| 6,611,925 B1 | 8/2003 | Spear |
| 6,914,905 B1 | 7/2005 | Yip et al. |
| 8,055,800 B1 | 11/2011 | Bardzil et al. |
| 8,312,270 B1 | 11/2012 | Chou |
| 8,347,349 B1 | 1/2013 | Wilson |
| 8,683,052 B1 | 3/2014 | Brinskelle |

(Continued)

FOREIGN PATENT DOCUMENTS

| | | |
|---|---|---|
| CA | 2826385 A1 | 8/2012 |
| CN | 109450959 A | 3/2019 |

(Continued)

OTHER PUBLICATIONS

Thapa, Manish, "Mitigating Threats in IoT Network Using Device Isolation", Maste?s Thesis, Feb. 4, 2018, 73 pgs.

(Continued)

*Primary Examiner* — Badri Narayanan
(74) *Attorney, Agent, or Firm* — Patent Law Works LLP

(57) ABSTRACT

A technique to stop lateral movement of ransomware between endpoints in a VLAN is disclosed. A security appliance is set as the default gateway for intra-LAN communication. Message traffic from compromised endpoints is detected. Attributes of ransomware may be detected in the message traffic, as well as attempts to circumvent the security appliance. Compromised devices may be quarantined.

14 Claims, 15 Drawing Sheets

(56) References Cited

U.S. PATENT DOCUMENTS

| | | |
|---|---|---|
| 8,850,185 B1 | 9/2014 | Vaughn |
| 8,869,259 B1 | 10/2014 | Udupa |
| 9,225,736 B1 | 12/2015 | Roundy |
| 9,282,114 B1 | 3/2016 | Dotan |
| 9,306,965 B1 | 4/2016 | Grossman et al. |
| 9,602,529 B2 | 3/2017 | Jones et al. |
| 9,712,504 B2 * | 7/2017 | Kurmala .......... H04L 63/0272 |
| 10,298,599 B1 | 5/2019 | Zhang |
| 10,454,950 B1 | 10/2019 | Aziz |
| 11,030,311 B1 * | 6/2021 | Lopez .................. G06N 20/00 |
| 11,093,139 B1 | 8/2021 | Karr et al. |
| 11,171,985 B1 | 11/2021 | Agrawal |
| 11,252,183 B1 | 2/2022 | Agrawal |
| 11,303,669 B1 | 4/2022 | Agrawal |
| 11,303,673 B1 | 4/2022 | Agrawal |
| 11,323,474 B1 | 5/2022 | Agrawal |
| 11,374,964 B1 | 6/2022 | Agrawal |
| 2003/0212907 A1 * | 11/2003 | Genty ................... H04L 61/00 713/150 |
| 2006/0028996 A1 | 2/2006 | Huegen |
| 2007/0101432 A1 | 5/2007 | Carpenter |
| 2008/0184157 A1 | 7/2008 | Selig |
| 2009/0328209 A1 | 12/2009 | Nachenberg |
| 2010/0281159 A1 | 11/2010 | Boscolo |
| 2012/0079122 A1 | 3/2012 | Brown |
| 2013/0298242 A1 | 11/2013 | Kumar |
| 2014/0020053 A1 | 1/2014 | Kay |
| 2014/0059642 A1 | 2/2014 | Deasy |
| 2015/0281172 A1 | 10/2015 | He |
| 2016/0197962 A1 | 7/2016 | Winn |
| 2016/0323318 A1 | 11/2016 | Terrill et al. |
| 2017/0039310 A1 | 2/2017 | Wang |
| 2017/0085530 A1 * | 3/2017 | Volkov ............... H04L 63/0272 |
| 2017/0093910 A1 | 3/2017 | Gukal |
| 2017/0149775 A1 | 5/2017 | Bachar et al. |
| 2017/0289134 A1 | 10/2017 | Bradley |
| 2017/0289191 A1 | 10/2017 | Thioux |
| 2017/0339190 A1 | 11/2017 | Epstein |
| 2017/0339250 A1 | 11/2017 | Momchilov |
| 2017/0344743 A1 | 11/2017 | Shi |
| 2018/0013788 A1 | 1/2018 | Vissamsetty |
| 2018/0097840 A1 | 4/2018 | Murthy |
| 2018/0189508 A1 | 7/2018 | Li |
| 2018/0324201 A1 | 11/2018 | Lowry |
| 2019/0116193 A1 | 4/2019 | Wang |
| 2019/0166152 A1 | 5/2019 | Steele |
| 2019/0245831 A1 | 8/2019 | Petit |
| 2019/0253432 A1 | 8/2019 | Ohtani |
| 2019/0312836 A1 | 10/2019 | Phillips |
| 2019/0332765 A1 | 10/2019 | Fu |
| 2020/0137110 A1 | 4/2020 | Tyler |
| 2020/0145416 A1 | 5/2020 | Mitzimberg |
| 2020/0228547 A1 | 7/2020 | Kottapalli |
| 2020/0356664 A1 | 11/2020 | Maor |
| 2021/0058395 A1 | 2/2021 | Jakobsson |
| 2021/0136037 A1 | 5/2021 | Balasubramaniam |
| 2021/0152595 A1 * | 5/2021 | Hansen ................. G06F 21/554 |
| 2021/0218770 A1 | 7/2021 | Ben-Yosef |
| 2021/0264233 A1 | 8/2021 | Gronat |
| 2021/0280315 A1 | 9/2021 | Woldenberg |
| 2021/0344667 A1 | 11/2021 | Huston, III |
| 2021/0400057 A1 | 12/2021 | Devane |
| 2022/0217133 A1 | 7/2022 | Montgomery |
| 2022/0217169 A1 | 7/2022 | Varanda |
| 2022/0229906 A1 | 7/2022 | Balek |
| 2022/0360983 A1 | 11/2022 | Raman |
| 2022/0368689 A1 | 11/2022 | Ben-Noon |
| 2022/0398321 A1 | 12/2022 | Baldwin |

FOREIGN PATENT DOCUMENTS

| | | |
|---|---|---|
| CN | 114143034 A | 3/2022 |
| CN | 115396230 A | 11/2022 |
| EP | 1844399 B1 | 6/2019 |
| TW | M623435 | 2/2022 |
| WO | 2005125084 A1 | 12/2005 |
| WO | 2008074621 A1 | 6/2008 |
| WO | 2016191376 A1 | 12/2016 |
| WO | 2018157247 A1 | 9/2018 |
| WO | 2021009645 A1 | 1/2021 |

OTHER PUBLICATIONS

International Search Report and Written Opinion for PCT/US2020/020593, dated Apr. 15, 2020, 8 pgs.

International Preliminary Report on Patentability for PCT/US2020/020593, Completed May 18, 2021, 8 pgs.

* cited by examiner

SYSTEM AND METHOD FOR DYNAMICALLY AVOIDING DOUBLE ENCRYPTION OF ALREADY ENCRYPTED TRAFFIC OVER POINT-TO-POINT VIRTUAL PRIVATE NETWORKS FOR LATERAL MOVEMENT PROTECTION FROM RANSOMWARE

CROSS REFERENCE TO RELATED APPLICATIONS

This application is a continuation in part of U.S. patent application Ser. No. 17/521,092, filed Nov. 8, 2021, entitled "System and Method to Detect Lateral Movement of Ransomware by Deploying a Security Appliance Over a Shared Network to Implement a Default Gateway with Point-To-Point Links Between Endpoints", which is a continuation of U.S. patent application Ser. No. 17/357,757, filed Jun. 24, 2021, entitled "System and Method to Detect Lateral Movement of Ransomware by Deploying a Security Appliance Over a Shared Network to Implement a Default Gateway with Point-To-Point Links Between Endpoints", which is hereby incorporated by reference in their entirety.

FIELD OF THE INVENTION

The present disclosure generally relates to techniques for ransomware protection. More particularly, the present disclosure is related to avoiding double encryption of already encrypted traffic over point-to-point virtual private networks for lateral movement protection from ransomware.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

Ransomware is one of the biggest threats facing the security industry today. Businesses have deployed multiple layers of security solutions to defend themselves against ransomware attacks. However, despite this, these attacks continue to occur, and enterprises find themselves in a situation where they either must pay the demanded ransom or risk losing access to critical business assets and data.

This situation is further exacerbated by the recent shift to hybrid work models where a large portion of the workforce is remote. This shift to a hybrid and remote workforce has exposed cracks and weaknesses in traditional perimeter-based security models. Furthermore, there are certain classes of business assets which are high-value/mission-critical and frequently targeted for data-encryption and exfiltration by ransomware attacks. These include ERP systems, finance databases and sensitive corporate data. With a hybrid work model, there has been a shift in executives and corporate officers trying to access these assets remotely. This has resulted in a more pressing need to provide secure access to these mission critical assets while at the same time protecting them from ransomware and other malware attacks.

Organizations have attempted to address these security gaps by investing heavily in various Zero Trust Security solutions (these are variously referred to as Zero Trust Network Architecture or Software Defined Perimeter) to enable their hybrid workforce to securely access mission critical business applications. These solutions are based upon the notion of verifying user identity, credentials and endpoint certificates and security postures before allowing access to private Enterprise applications. When correctly deployed, these solutions can be highly effective in protecting against the lateral propagation of ransomware from compromised endpoints to the private applications. However, many of these solutions also have various downsides.

SUMMARY

A technique to avoid a double encryption penalty for a virtual private network is disclosed. A packet inspection capability is added to a tunnel client and a tunnel server.

Packets associated with services which do not require additional encryption are identified and encryption is skipped for those packets.

A technique to detect lateral propagation of ransomware between endpoints in a VLAN is also disclosed. In one implementation, a smart appliance is deployed in an access port or a trunk port of a VLAN network. The smart appliance is set as the default gateway for intra-LAN communication for two or more endpoint devices. Message traffic from compromised endpoints is detected.

Additional measures may also be taken to generate alerts or quarantine compromised end point devices.

An example of a computer-implemented method of ransomware protection in a Virtual Local Area Network (VLAN) includes deploying a security appliance in an access or a trunk port of a shared VLAN environment. A subnet mask of 255.255.255.255 is used to set the security appliance as a default gateway for a plurality of endpoint devices of the shared VLAN environment. The security appliance monitors intra-VLAN communication between the plurality of endpoint devices of the shared VLAN environment. The security appliance detects lateral propagation of ransomware between endpoint devices via intra-VLAN communication in the shared VLAN environment.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Implementation of this disclosure includes 1) techniques to avoid a performance penalty associated with double encryption of point-to-point a virtual private network (VPN) and 2) a virtual local area network with a security appliance to provide point-to-point links in the VLAN with increased security from lateral propagation of ransomware. The techniques to avoid a performance penalty associated with double encryption may be used independently of the security appliance. However, in some implementations, the techniques to avoid the performance penalty associated with double encryption may be used in combination with the security appliance.

VLAN with Security Appliance

Figure 1:
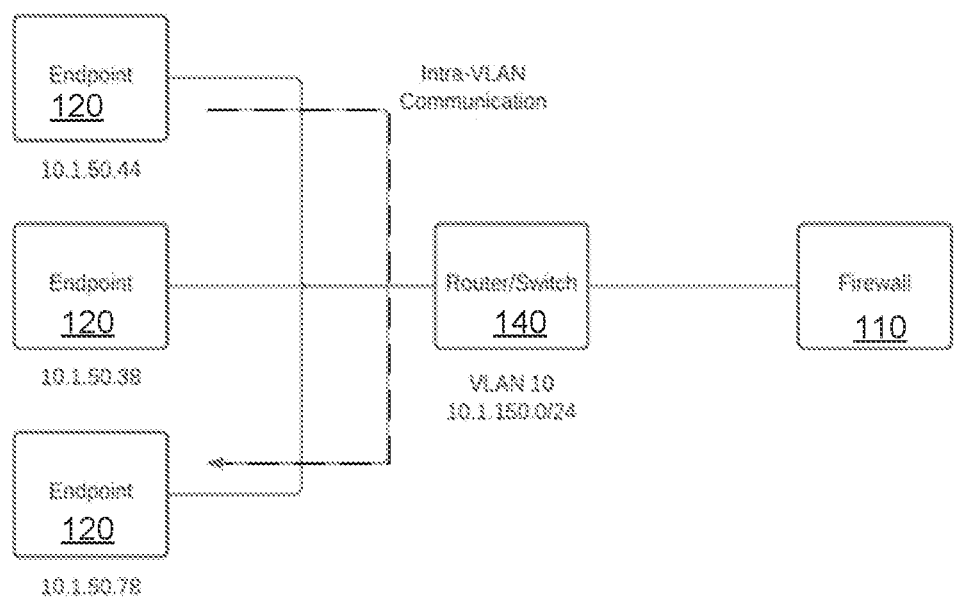
FIG. 1 is a block diagram illustrating Intra-LAN traffic in a conventional VLAN network.
Figure 2:
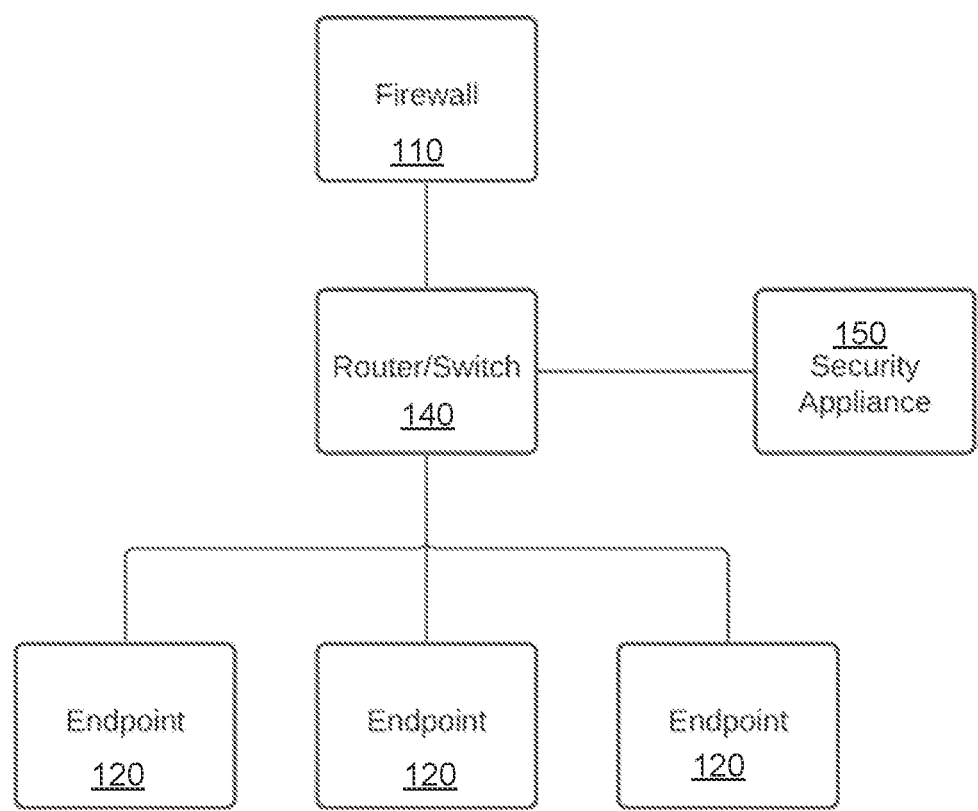
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security application 150 may be implemented as software compatible with a virtual machine (VM) implementation, such as within a hypervisor implementation in VMware®. The security appliance may be deployed on a port that allows the security application to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) server responsible for dynamically assigning an IP address and other network configuration parameters to each endpoint device on the network so that they communicate with each other in the existing VLAN network.

When an individual endpoint 120 requests an IP address, the security appliance 150 responds back with an IP address and a subnet mask that sets the security appliance as the default gateway for the endpoint. In one implementation, the security appliance responds with a subnet comprised of all ones—255.255.255.255—that sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
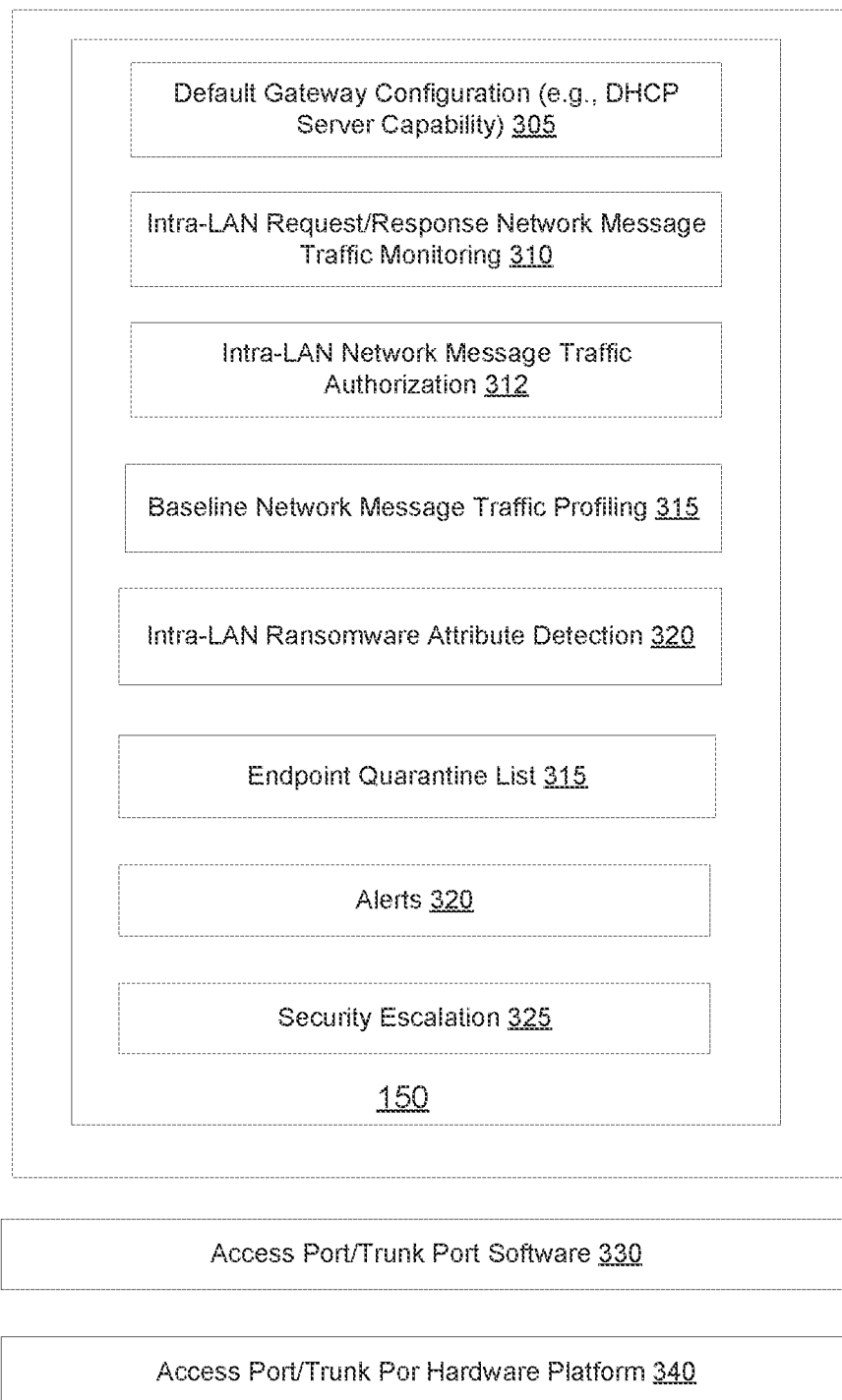
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 315 to quarantine compromised endpoints. This may include, for example, generating a list of quarantined endpoint devices that are used to block intra-LAN communication for compromised devices (i.e., to stop the lateral movement of ransomware). An alert unit 320 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
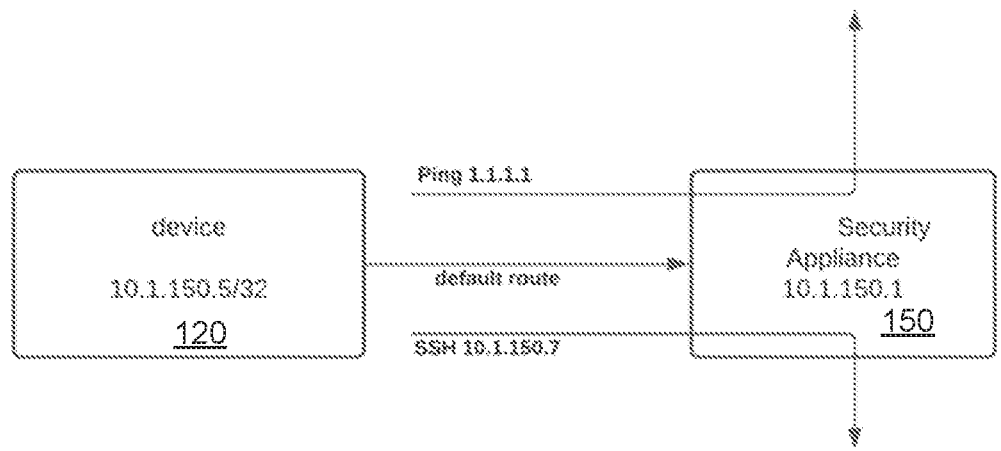
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
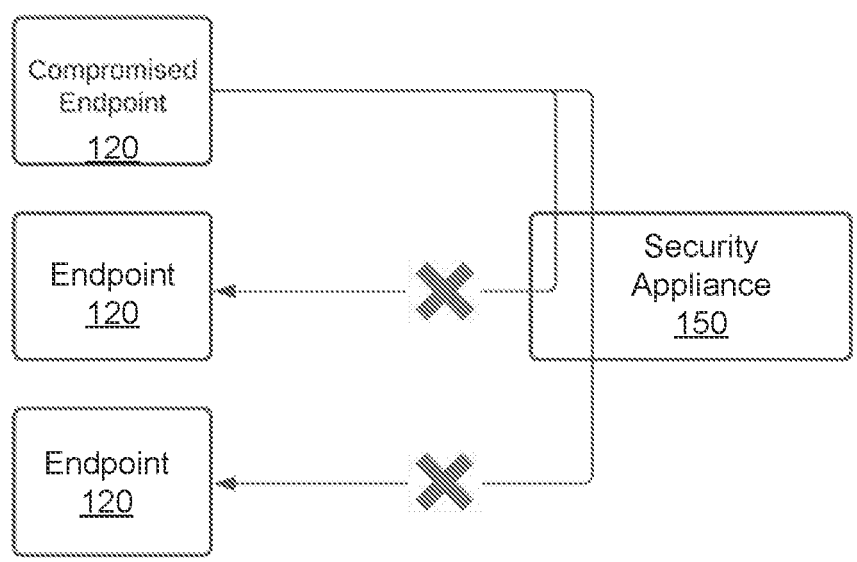
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
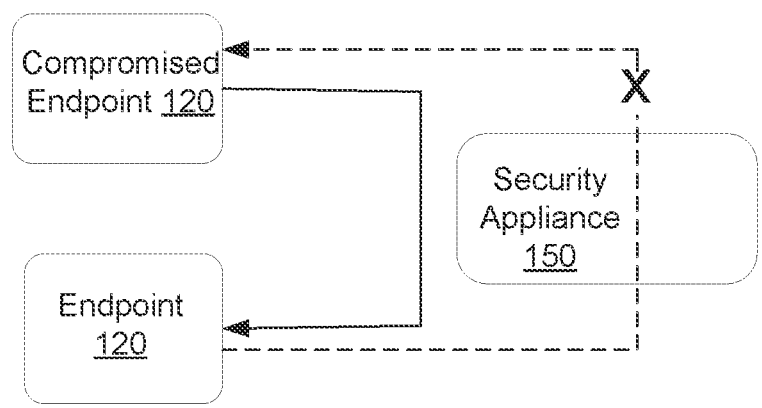
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
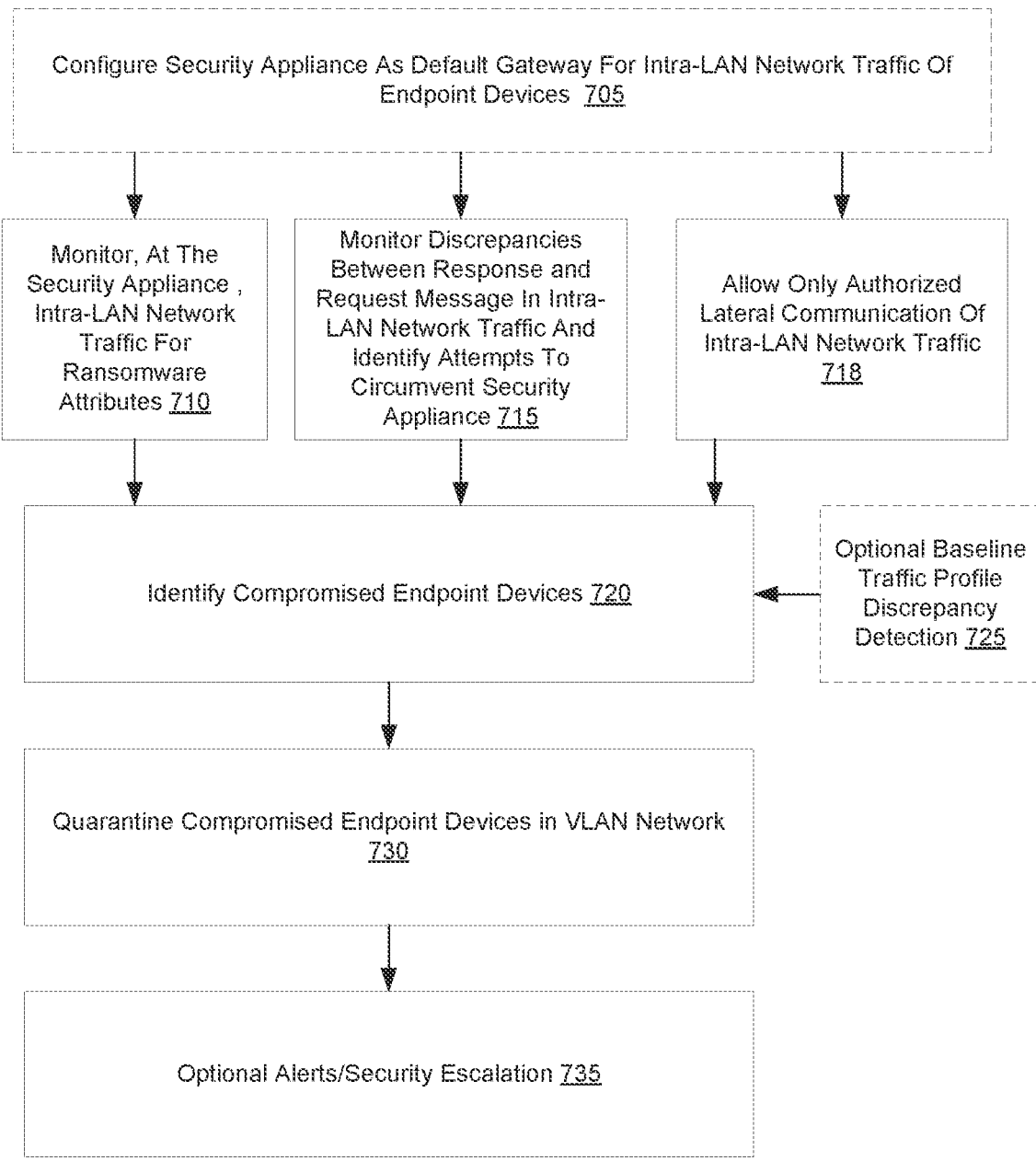
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance.

In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

Avoiding a Double Encryption Penalty of Already Encrypted Packets

Many organizations have invested in various Zero Trust Security solutions (these are variously referred to as a Zero Trust Network Architecture or a Software Defined Perimeter) to enable a hybrid workforce to securely access mission critical business applications. These solutions are based upon the notion of verifying user identity, credentials and endpoint certificates and security postures before allowing access to private Enterprise applications. When correctly deployed, these solutions can be highly effective in protecting against the lateral propagation of ransomware from compromised endpoints to the private enterprise applications.

However, a fundamental premise in the Zero Trust Security model is to encrypt all user traffic from the client devices all the way to the private enterprise applications. This prevents eavesdropping and man-in-the-middle attacks which can lead to sensitive data being compromised. This encryption is usually accomplished by creating secure layer 3 or layer 4 tunnels between the clients and the end applications. Examples of such tunnels include IPsec tunnels, Wireguard and TLS based tunnels. All end user traffic is encrypted and tunneled all the way to the destination, where it is decrypted and de-tunneled before handing off to the private enterprise application.

However, a problem with this approach is that more than 80-90% of the traffic towards private web and non-web applications today is already encrypted (through the widespread use of HTTPS and TLS protocols). Passing such encrypted traffic via encrypted tunnels results in double encryption of the user data, which besides being pointless (encrypting already encrypted data does not do much to improve the overall encryption security) also results in a performance degradation due to the additional layer of encryption being performed.

This takes us to several important issues in modern hybrid work models in which many individuals in an organization work at home. Many organizations permit employees to work from home for at least a few days a week. Some organization also have remote employees who do most (or even all) of their work from remote locations. These modern work models mean that some employees may be working at home (or on the road) from locations in which there are limitations on Internet/network bandwidth.

This performance penalty associated with double encryption affects operations of IT/Operational personnel who frequently need secure high-bandwidth remote access (via SSH, RDP and other encrypted protocols) for various purposes, such as accessing Windows and Linux build and application servers running within corporate data centers.

Modern organizational work models means that an enterprise may 1) have some workers doing their work from remote locations that have limited Internet/network bandwidth; and 2) some remote workers may need to access applications and application servers that have potentially high data transport requirements.

For example, due to the recent global pandemic, some of these IT/Operational personnel have relocated to geographical areas which may be bandwidth constrained. The double encryption performance penalty affects this segment of users as they use VPN and other secure tunnels to access mission critical applications and servers.

Eliminating the double encryption performance penalty is particularly beneficial for workers working from geographical areas that may be bandwidth constrained. Also, eliminating the double encryption performance penalty is beneficial for workers living in geographical areas in which high bandwidth connections exist but are expensive or in areas in which the quality of the Internet connections is decreased when local networks are overloaded during peak times of use.

Various techniques have been used in the past to avoid paying the double encryption performance tax. But these have various disadvantages and problems. These include setting up two tunnels from the client to the server, one of which encrypts the traffic and the other uses NULL encryption (does not encrypt the payload) and use policy-based routing to selectively steer traffic to the appropriate tunnel based on the traffic protocol and service. However, these techniques are complex and difficult to implement on end user devices which may run a variety of commercial operating such as Windows™, MacOS™ and mobile operating systems such as Android™.

Figure 8:
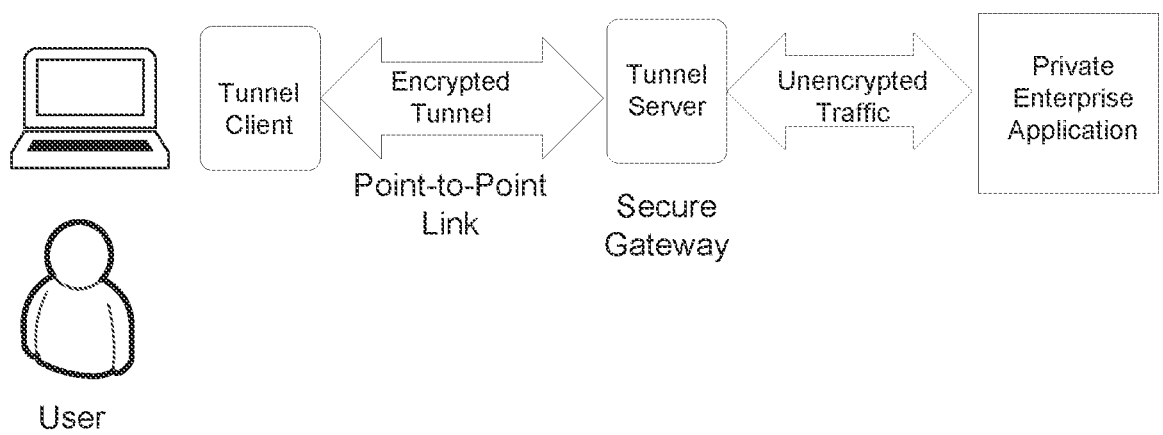
FIG. 8 illustrates a prior art secure tunnel technique.

FIG. 8 illustrates a conventional Zero Trust Architecture. The Zero Trust Architecture recommends that all end user traffic be encrypted all the way from the user's endpoint (e.g., their laptop computer) to the private enterprise application. This prevents malicious attackers from eavesdropping on the traffic connection and gaining access to sensitive business data. The most common methodology of achieving this is the use of encrypted tunneling technologies to encrypt all traffic from the end user device to the private application. A tunnel client deployed on the end user's devices is responsible for encrypting all data traffic destined towards private enterprise applications. However not all private enterprise applications are capable of decrypting encrypted traffic. As a result, typically, a secure gateway (e.g., a tunnel server) is deployed in the enterprise data center which serves as the tunnel termination point. Examples of Secure Gateways are VPN gateways, IPSec or Wireguard gateways. The traffic from the secure gateway to the private enterprise application may or may not be encrypted depending upon whether the private enterprise application supports it.

However, most enterprise applications in use today, use HTTPS or TLS based encryption where the application payload is encrypted from the end user device to the private application. When such traffic is tunneled via an encrypted tunnel, the tunneling protocol double encrypts the user payload without consideration to the fact that the payload is already encrypted. This is done because the tunneling protocol does not inspect the payload type to determine whether encryption needs to be applied on it or not.

This double encryption can cause a significant performance penalty and affects the end user experience when accessing private enterprise applications.

Figure 9:
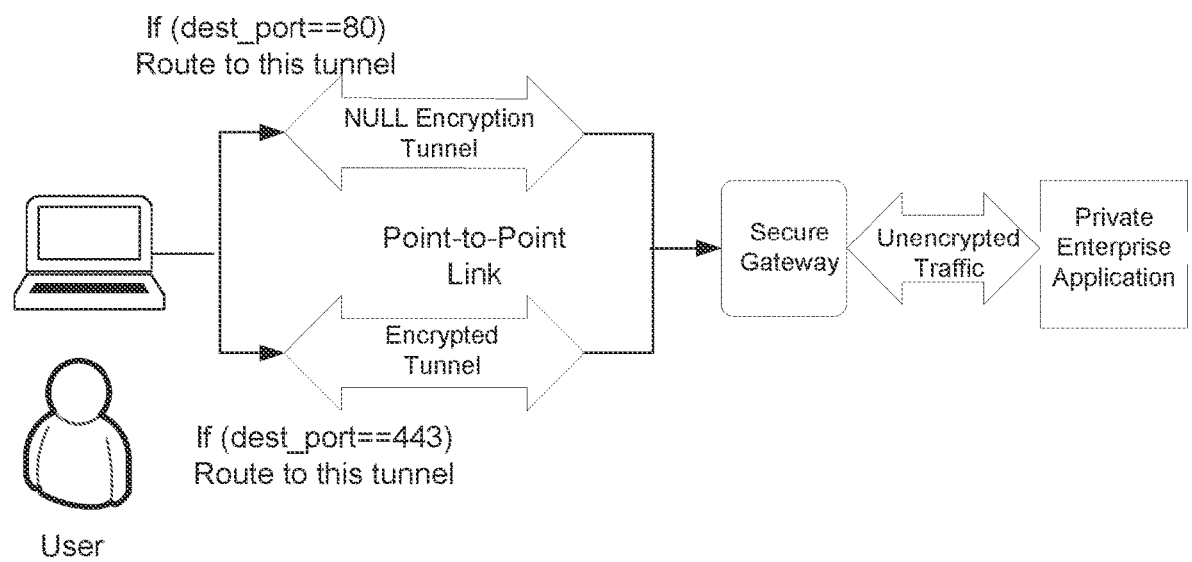
FIG. 9 illustrates a prior art secure tunnel technique using two tunnels.

As illustrated in FIG. 9, current solutions to avoid paying this double encryption penalty involve the use of two tunnels (one with encryption and one without) and use policy-based routing to switch traffic between them. A policy is applied to the user endpoint to switch traffic based on the TCP destination port in the network packet. If the destination port is 80 (commonly used by HTTP protocol which is un-encrypted), traffic is steered to the encrypted tunnel. If the destination port is 443 (commonly used by HTTPS protocol which uses TLS encryption), then traffic is steered to a tunnel which has been configured to use NULL encryption. This avoids the double encryption for HTTPS by passing it through the encrypted tunnel. However, this approach has several disadvantages.

Some of the disadvantages of the approach of FIG. 9 include the fact that configuring policy-based routing on user endpoints (especially those running Microsoft Windows or Apple MacOS operating systems) is complex and error prone. Some features required by this kind of policy routing may not be supported on these operating systems and devices. For example, an individual enterprise organization may have issued laptop computers to remote employees that have operating systems for which policy-based routing is complex, error prone, or not supported. That is, it may be difficult or impractical for an organization to implement the type of policy-based routing illustrated in FIG. 9. There is also another problem with the approach of FIG. 9. It increases overhead on the secure gateway, as it now must support twice the number of tunnels from each client endpoint. This can result in increased memory consumption and can impact performance further.

Figure 10A:
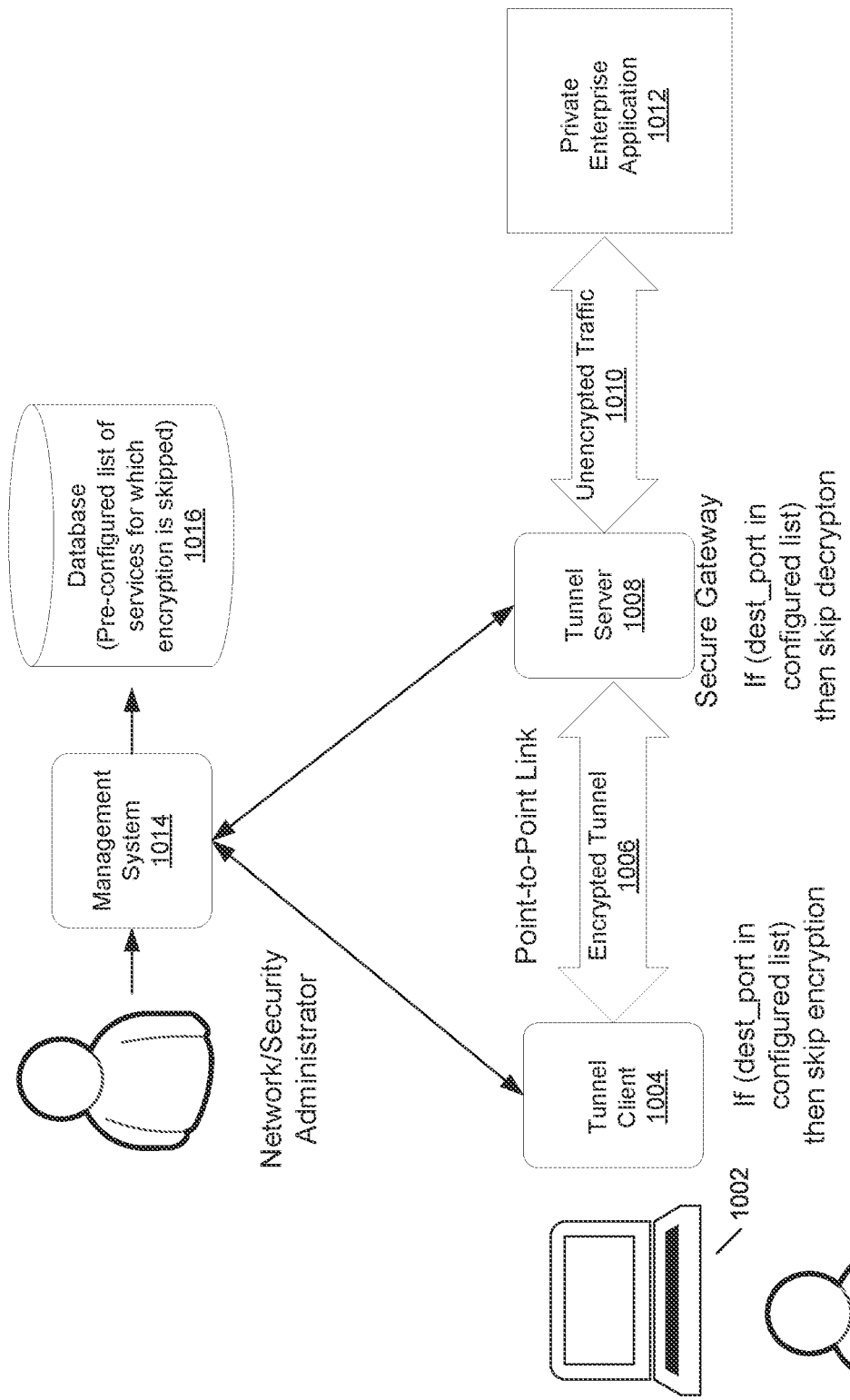
FIGS. 10A and 10B illustrate a system for dynamically avoiding double encryption of already encrypted traffic over point-to-point virtual private networks in accordance with two implementations.
Figure 10B:
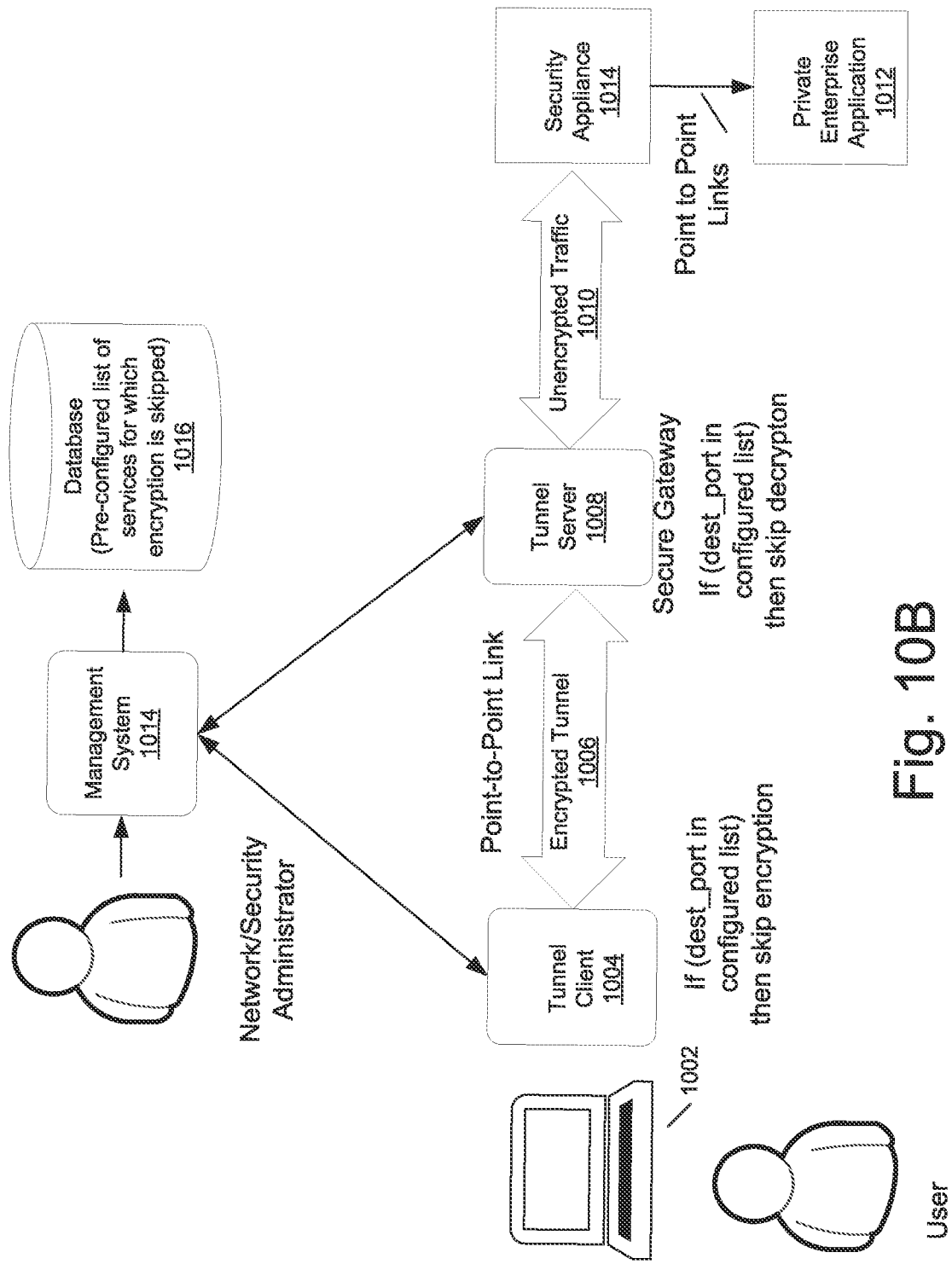

FIGS. 10A and 10B illustrate examples of a system for avoiding the double encryption penalty. FIG. 10A illustrates an approach for eliminating the double encryption penalty. FIG. 10B further extends this to using the previously discussed security appliance of the VLAN to provide an additional form of lateral ransomware protection.

An encrypted tunnel 1006 may be formed using a tunneling protocol between a tunnel client 1004 associated with a client device 1002 and a tunnel server 1008 serving as a secure gateway. For example, Wireguard may be used as the tunneling protocol, though this technique is equally applicable to other encryption/tunneling technologies such as IPSEC and TLS.

A management system 1014 generates and stores (e.g., in database 1016) a pre-configured list of services for which encryption is to be skipped. This can also be described as a "skip list." This list identifies services for which it desired to avoid double encryption of already encrypted traffic over point-to-point virtual private networks.

The configured list of services may, for example, be selected by a network or security administrator. For example, the network or security administrator could select a list of services based on various criteria, such as whether the payload associated with the service is already encrypted, whether the services are part of a Zero trust solution, etc. Other criteria could also be selected, such as configuring certain types of services, such as for traffic to or more private enterprise applications. As another example, various criteria could be considered by management software to generate a recommended configured list of services that do not require additional encryption.

While a network/security administrator may select the list of services, more generally software could include an algorithm to identify and recommend a list of service for which encryption is skipped.

In one implementation, the tunnel client 1004 and tunnel server 1008 are modified to have a data packet inspection capability. The tunnel client 1004 and the tunnel server 1008 each receive a copy of the configured list of services from the management system. For example, the management system may use any secure means of communicating with the tunnel client 1004 and tunnel server 1008 to perform a configuration process. This may include, for example, the tunnel client and the tunnel server querying the management system. However, more generally, the management system 1014 could initiate communication with the tunnel client and the tunnel server The tunnel client locally 1004 stores a copy of the configured list of services.

An individual service may have, for example, an associated destination port. For example, a particular private enterprise application may have an associated destination port. Thus, in one implementation, the configured list of services corresponds to a list of ports for the configured lists of services. In one example of a skip list implementation, when a packet is inspected in view of the skip list, it identifies packets for which additional encryption/decryption may be skipped, such as packets associated with a private enterprise application. This may be performed by examining the port number associated with the packet, although more generally any type of inspectable packet information could be considered that is indicative of the packet having been already encrypted.

In one implementation, the tunnel client 1004 is configured to inspect packets and skip encryption if the destination port of the packet is in the configured list. As illustrated in FIG. 10A, in one example, the tunnel client 1004 runs a simple logic test: if (dest_port in configured list) then skip encryption.

In one implementation, the tunnel server 1008 is configured to inspect packets and skip decryption if the destination port in the packet is in the configured list. As illustrated in FIG. 10A, in one example, the tunnel server 1008 runs a simple logic test: if (dest_port in configured list) then skip decryption.

Note that in this example, a destination port is associated with a configured list of services. There is thus a mapping between destination port(s) and the configured list of services. For example, a destination TCP port may match a port associate with the pre-configured list of services.

In one implementation, when network traffic from the user endpoint is destined to the private enterprise application, the tunnel client 1004 inspects the data packet header for each packet traversing through the tunnel. If the destination TCP port matches a pre-configured list of services (configured by the network administrator on a management system), then the tunnel client 1004 skips encrypting the packet payload and instead directly tunnels the data packet towards the destination.

On the receiving end, the tunnel server 1008 applies an analogous algorithm when it receives data packets from the client. In one implementation, if the packet header (upon inspection) indicates that the destination port matches a pre-configured list of services, then the tunnel server doesn't decrypt the payload. Instead, it directly delivers the data packet to the end application.

If the destination port in the data packet header does not match any of the pre-configured list of services, then the tunnel client/server encrypts/decrypts data traffic in the normal way.

This approach avoids the double encryption of already encrypted traffic over point-to-point virtual private networks for lateral movement protection from ransomware. As illustrated in FIG. 10B, the same process can also be applied for the case that the received traffic is received in a VLAN having a security appliance 1014 supporting point-to-point links with a private enterprise application 1012. In this example, the private enterprise applications are deployed behind the security appliance, which enforces a subnet mask of 255.255.255.255 (as discussed earlier). The security applicant 1014 may be implemented as either a separate appliance or be combined with the tunnel server. This ensures that the private enterprise applications are protected from lateral propagation threats from ransomware while also eliminating the double encryption performance penalty.

Figure 11:
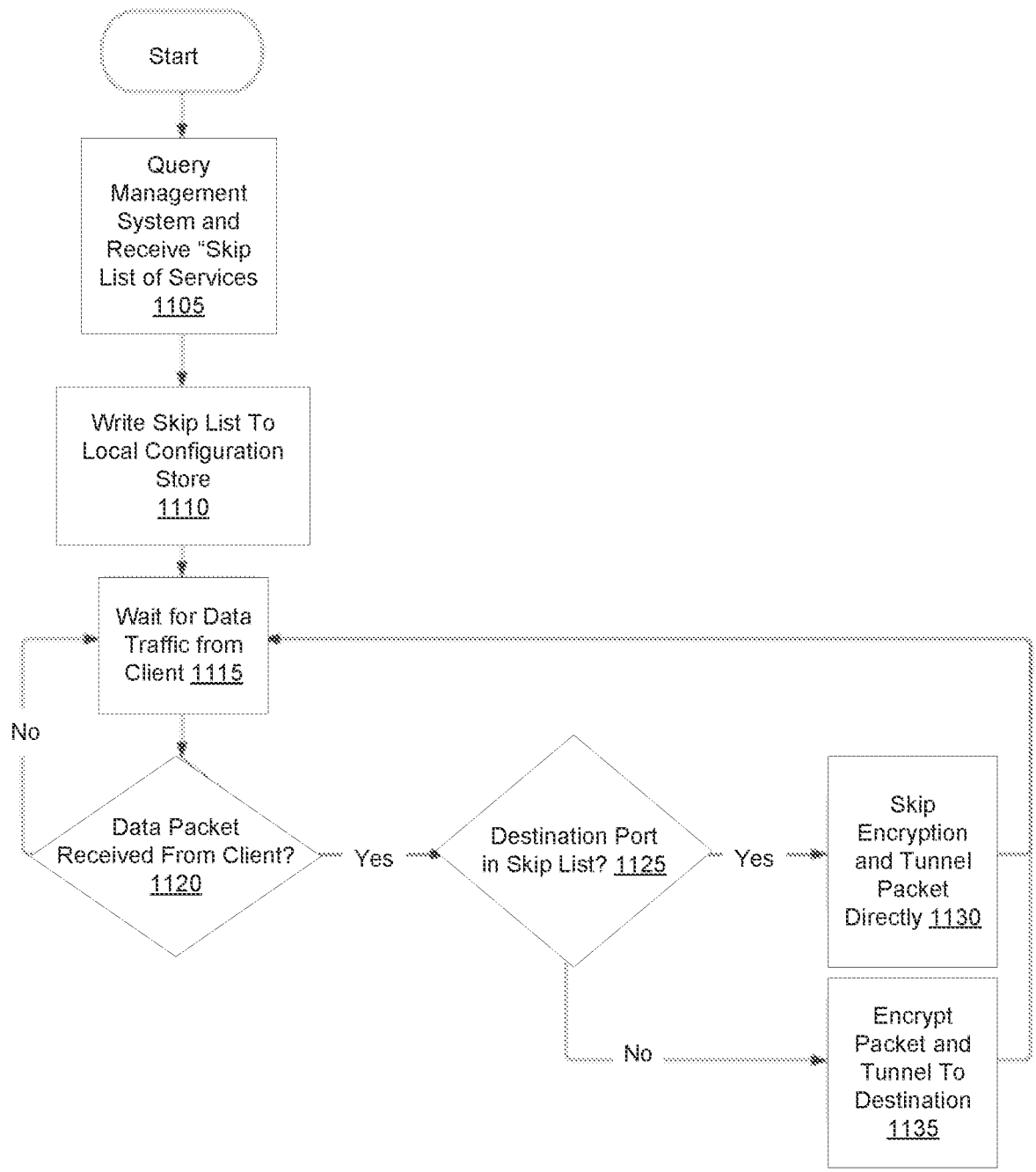
FIG. 11 is a flowchart of an example method implemented by a tunnel client in accordance with an implementation.

FIG. 11 illustrates an example of a method from the perspective of the tunnel client. In block 1105, the tunnel client queries the management system and receives the skip list of services. While a query approach is one example, more generally the management system could push the skip list to the tunnel client. In block 1110, the tunnel client writes the skip list to a local configuration store. The method then goes through a loop in which, in response to receiving data from the client endpoint computing device (e.g., a laptop computer, tablet device, etc.), it inspects packets, determines if the packet corresponds to a destination port in the skip list, and then makes a decision regarding whether to skip encryption. In block 1115, the method waits for data traffic from the client. In decision step 1120, a determination is made if a new data packet has been received from the client. If no, the process loops back to block 1115. If yes, the process inspects packet in decision block 1125 and determines if the destination port is in the skip list. If the destination port is not in the skip list, the packet is encrypted and tunneled to its destination in block 1135. If the destination port is in the skip list, then in block 1130 encryption of the packet is skipped and the packet directly tunneled to its destination.

Figure 12:
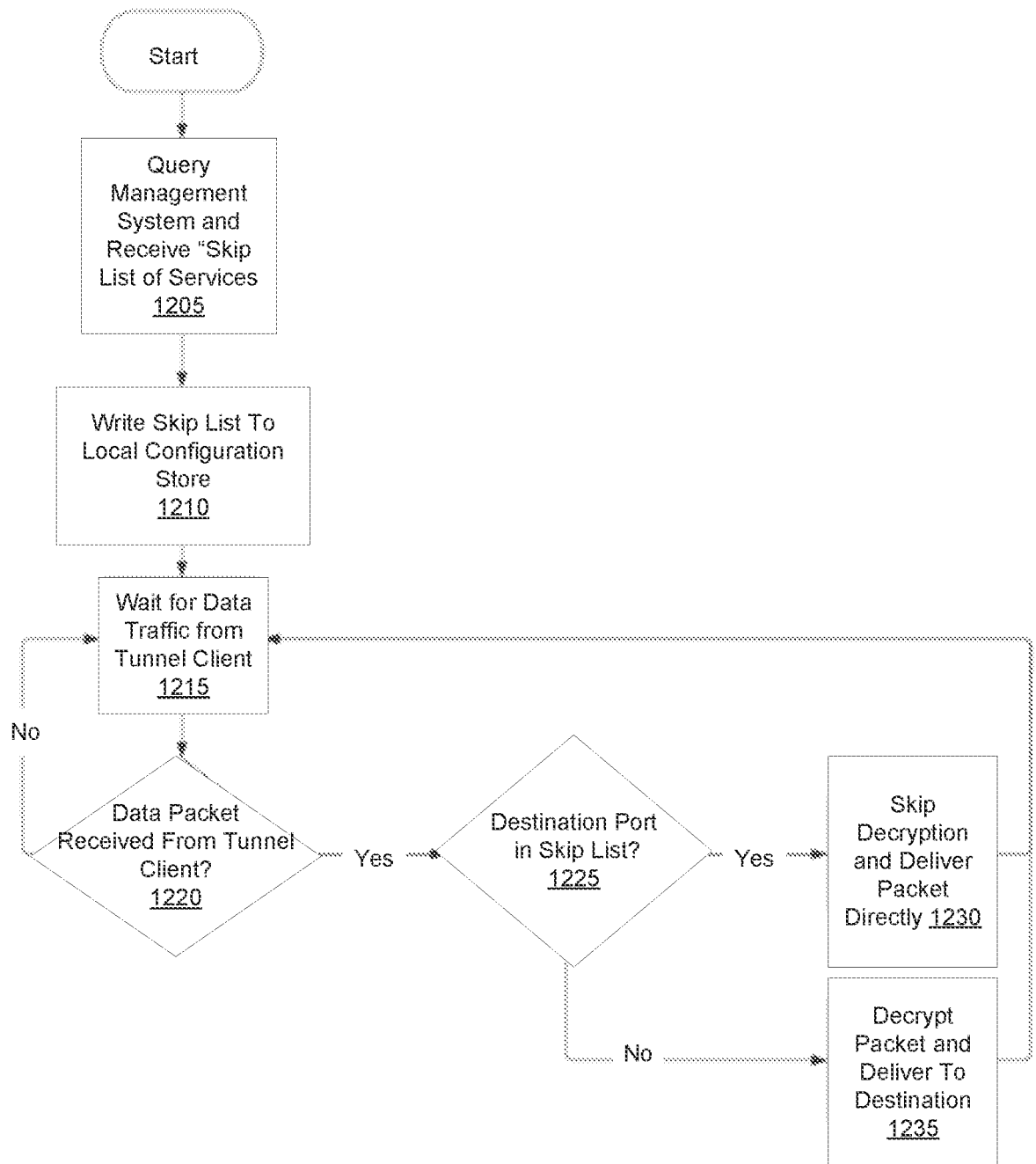
FIG. 12 is a flowchart of an example method implemented by a tunnel server in accordance with an implementation.

FIG. 12 illustrates an example of a method at the tunnel server. In block 1205, the tunnel server queries the management system and receives a copy of the skip list of services. While a query approach is one technical implementation, it will be understood that the management system could push the skip list to the tunnel server. In block 1210 the skip list is written to a local configuration store of the tunnel server. In block 1215, the tunnel server waits for data traffic from the tunnel client. In decision block 1220, a determination is made if a data packet has been received from the tunnel client. If no, the process loops back to block 1215. If yes, the process moves to decision block 1225, which inspects the packet and determines if the destination port is the skip list. If no, the process moves to block 1235 and the packet is descripted and delivered to its destination. If yes, the process moves to block 1230 and decryption is skipped, and the packet delivered directly.

Figure 13:
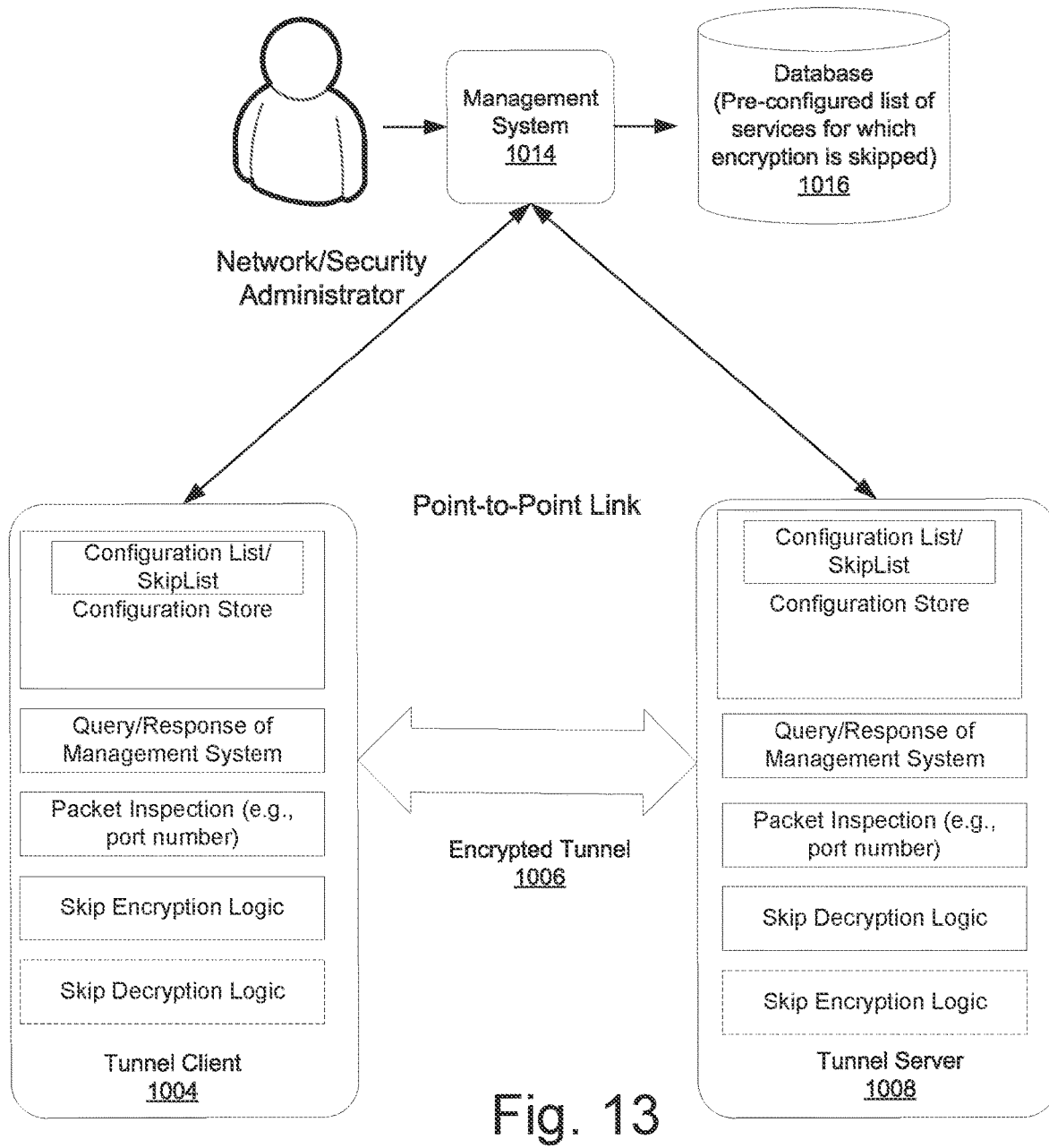
FIG. 13 illustrates an example tunnel client and tunnel server in accordance with an implementation.

As illustrated in FIG. 13, the tunnel client and tunnel server can more generally be implemented to 1) store information describing a list of services for which encryption is skipped, which may take the form of a skip list and corresponding packet attribute (e.g., packet port number); 2) have packet inspection modules that detects a packet attribute associated with the particular type of service that is already encrypted (e.g., such as the packet attribute being a port number); 3) the tunnel client includes skip encryption logic to implement a rule for skipping encryption (e.g., via port number); 4) the tunnel server includes skip decryption location to implement a rule for skipping decryption (e.g., via port number); and 5) instructions are included for the tunnel client/tunnel server to communicate with the management system to receive configuration information that includes information desiring the list of service for which encryption is skipped.

Referring to FIG. 13, it will also be understood for the purposes of reducing bandwidth requirements, the tunnel client and the tunnel server may also have a capability to dynamically bypass the double encryption of encrypted packets sent from the tunnel server to the tunnel client.

Many variations on the methods of FIGS. 11 and 12 are possible. The main point is that double encryption can be dynamically skipped, in a secure tunnel, for encrypted payloads for which there is no security benefit to double encryption. This can be done in an individual tunnel of a virtual private network and in a manner consistent with a Zero trust solution for preventing the lateral propagation of ransomware. Individual packets can be inspected, and double encryption avoided for applications in a configured list. Eliminating the double encryption penalty, in turn, helps to support modern organizations that have employees who work remotely on a part-time or full-time basis. In the modern workforce, many employees work remotely in geographic regions with Internet bandwidth constraints. Also, in some geographic regions, the effective Internet bandwidth varies over the course of a day, such as when wireless Internet access is impacted in times of the day when multiple users access the Internet from the same wireless Internet access points. Also, in the modern workforce many private enterprise applications require significant bandwidth. A combination of factors means that avoiding the double encryption penalty improves performance significantly when these protocols are used by remote employees to communicate with private enterprise applications or other business applications.

Figure 14:
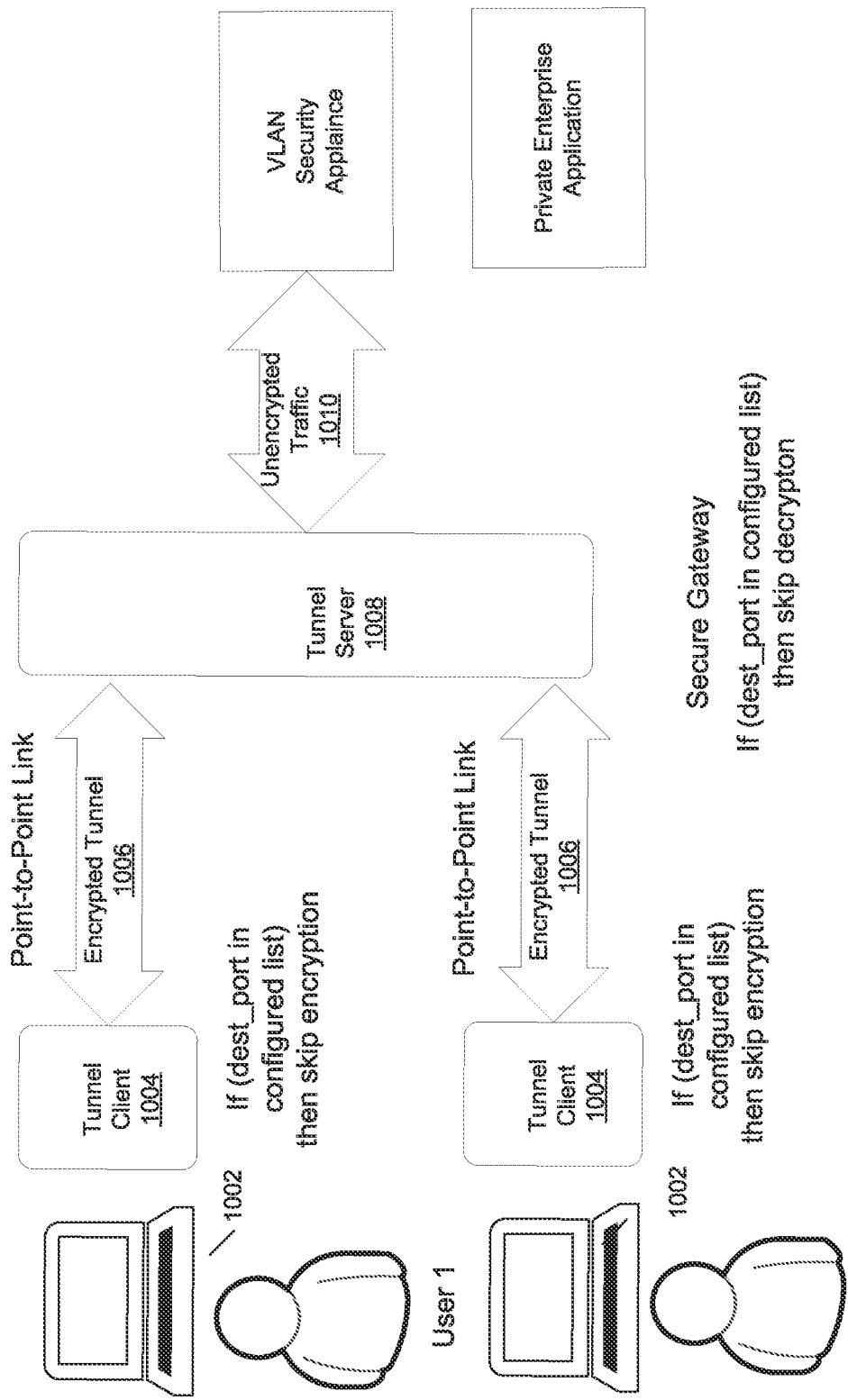
FIG. 14 illustrates an example of the system and method used by multiple users in accordance with an implementation.

As illustrated in FIG. 14, the same methodology can be used for an arbitrary number of remote users, N. For example, an organization with 300 employees may have 200 employees working remotely several days a week and 100 employees working remotely full time from a variety of remote locations. It's very common in the modern work force for employees to have the option to work remotely several days a week. It's also common in the modern work force for many employees to do all of their work remotely. Reducing the double encryption penalty can improve user experience and productivity of individual employees and the overall productivity of an organization as a whole in a manner that's consistent with a larger approach to preventing the spread of ransomware.

Alternate Embodiments

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:
   using a subnet mask of 255.255.255.255 to set a security appliance as a default gateway for a plurality of endpoint devices of the shared VLAN environment, with the security appliance providing at least one form of protection from the lateral movement of ransomware between the plurality of endpoint devices; and
   implementing a secure tunnel for a remote endpoint device of the plurality of endpoint devices, the secure tunnel for the remote endpoint device having a tunnel client and a tunnel server dynamically inspecting packet attributes and making decisions to avoid double encryption of already encrypted traffic over point-to-point virtual private networks, including:
   inspecting packets at the tunnel client, and in response to detecting packets having attributes associated with one or more services generating encrypted packets not requiring additional encryption, bypassing the encryption of the packets having the attributes, and tunneling the packets to the tunnel server; and
   inspecting received packets at the tunnel server, and in response to detecting packets having attributes associated with the one or more services generating encrypted packets, not decrypting the packets having the attributes.

2. The method of claim 1, wherein the attributes associated with one or more services generating encrypted packets comprises one or more port numbers, with the tunnel client not encrypting packets associated with the one or more port numbers and the tunnel server not decrypting packets associated with the one or more port numbers.

3. The method of claim 1, wherein the tunnel client receives information on a configured list of services from a management system.

4. The method of claim 1, wherein the tunnel server receives information on a configured list of services from a management system.

5. The method of claim 1, where the one or more services comprise private enterprise applications.

6. The method of claim 1, further comprising: allowing, by the security appliance, only authorized communication between the plurality of endpoint devices of the shared VLAN environment.

7. The method of claim 1, wherein the security appliance blocks unauthorized communication between the plurality of endpoint devices of the shared VLAN environment.

8. The method of claim 1, monitoring, by the security appliance, intra-VLAN communication between the plurality of endpoint devices of the shared VLAN environment and preventing, by the security appliance, lateral propagation of ransomware between endpoint devices via intra-VLAN communication in the shared VLAN environment.

9. A Virtual Local Area Network (VLAN) system, comprising:
   a VLAN including a security appliance, including a processor and a memory, configured as a default gateway for intra-VLAN communication of a plurality of endpoint devices using a subnet mask of 255.255.255.255;
   the security appliance configured to monitor intra-VLAN message traffic and implement at least one form of protection against lateral propagation of ransomware between endpoint devices of the shared VLAN environment;
   a virtual private network having secure tunnel to remote endpoint devices of the plurality of endpoint devices, each secure tunnel dynamically inspecting packets and not double encrypting packets corresponding to a service generating encrypted packets;
   a tunnel client and a tunnel server for a remote endpoint device of the plurality of endpoint devices to tunnel packets to the VLAN environment via a secure tunnel;
   the secure tunnel configured to dynamically inspect packet attributes and make decisions to avoid double encryption of already encrypted traffic over point-to-point virtual private networks; wherein
   the tunnel client inspects packets, and in response to detecting packets having attributes associated with one or more services generating encrypted packets not requiring additional encryption, bypassing the encryption of the packets having the attributes, and tunneling the packets to the tunnel server; and
   the tunnel server inspects received packet from the tunnel client, and in response to detecting packets having attributes associated with the one or more services generates encrypted packets, not decrypting the packets having the attributes.

10. The VLAN system of claim 9, further comprising a management system to generate configuration information for the tunnel client and the tunnel server, the configuration information identifying a list of configured services to make decisions regarding avoiding double encryption of already encrypted traffic.

11. The VLAN System of claim 10, wherein the management system generates information on packet attributes associated with configured service for which double encryption is to be skipped.

12. The VLAN system of claim 11, wherein the packet attributes comprise port numbers.

13. The system of claim 9, wherein the attributes associated with one or more services generating encrypted packets comprises one or more port numbers, with the tunnel client not encrypting packets associated with the one or more port numbers and the tunnel server not decrypting packets associated with the one or more port numbers.

14. A method of providing ransomware protection for an enterprise, comprising:
   providing a first form of ransomware protection against lateral protection of ransomware using a subnet mask of 255.255.255.255 to set a security appliance as a default gateway for a plurality of endpoint devices of a shared VLAN environment, with the security appliance providing at least one form of protection from the lateral movement of ransomware between the plurality of endpoint devices; and
   providing a second form of ransomware protection for an endpoint device of the plurality of endpoint devices by implementing a secure tunnel for the remote endpoint device of the plurality of endpoint devices, the secure tunnel for the remote endpoint device having a tunnel client and a tunnel server dynamically inspecting packet attributes and making decisions to avoid double encryption of already encrypted traffic over point-to-point virtual private networks, including:
   inspecting packets at the tunnel client, and in response to detecting packets having attributes associated with one or more services generating encrypted packets not requiring additional encryption, bypassing the encryption of the packets having the attributes, and tunneling the packets to the tunnel server; and inspecting received packets at the tunnel server, and in response to detecting packets having attributes associated with the one or more services generating encrypted packets, not decrypting the packets having the attributes.

* * * * *